United States Patent [19]

Rossborough

[11] 4,009,545
[45] Mar. 1, 1977

[54] APPARATUS FOR PIPE-TO-MANHOLE SEALING

[75] Inventor: John C. Rossborough, Amherst, N.H.

[73] Assignee: Merchants National Bank of Manchester, Manchester, N.H.

[22] Filed: Sept. 25, 1975

[21] Appl. No.: 616,862

Related U.S. Application Data

[60] Continuation of Ser. No. 374,029, June 26, 1973, abandoned, Division of Ser. No. 257,703, May 30, 1972, abandoned.

[52] U.S. Cl. .................................. 52/173 R; 52/20; 52/749; 173/32; 248/17; 408/88; 408/103
[51] Int. Cl.² ........................................ E21C 11/00
[58] Field of Search ............. 173/32, 33; 408/72 F, 408/108, 103, 88, 234, 111, 135; 248/17; 52/20, 749, 173

[56] References Cited

UNITED STATES PATENTS

| | | | |
|---|---|---|---|
| 456,918 | 7/1891 | Tetlow | 408/72 X |
| 1,395,194 | 10/1921 | Lindhe | 408/135 X |
| 2,730,334 | 1/1956 | Sullivan | 173/33 X |
| 3,234,977 | 2/1966 | Byers | 408/234 X |
| 3,412,813 | 11/1968 | Johnson | 408/135 X |
| 3,448,477 | 6/1969 | Ricordeau et al. | 173/32 X |
| 3,586,079 | 6/1971 | Collins et al. | 408/88 X |
| 3,696,874 | 3/1971 | Brinkman | 173/32 |
| 3,741,671 | 6/1973 | Douglass | 408/135 X |

Primary Examiner—Ernest R. Purser
Assistant Examiner—William F. Pate, III
Attorney, Agent, or Firm—Pearson & Pearson

[57] ABSTRACT

A pre-cast, reinforced concrete manhole riser is provided with a precisely aligned porthole for a sewer pipe, by cutting the hole on the site, the resulting smooth-faced, unobstructed porthole being sealed by a flexible collar having one end clamped on the pipe and having a flange at the other end adhered to the riser around the cut hole. Apparatus for cutting the hole, on the site, clamps on the upper rim of the riser, there being a cutter and carriage which move relative to a clamped frame.

7 Claims, 6 Drawing Figures

APPARATUS FOR PIPE-TO-MANHOLE SEALING

This application is a continuation of my application Ser. No. 374,029 filed June 26, 1973, that application being a division of my application Ser. No. 257,703 filed May 30, 1972, both now abandoned.

BACKGROUND OF THE INVENTION

In the art of underground sewer construction, the manholes which receive the sewer pipes are now usually pre-cast of reinforced concrete in a factory, with a base, one or more cylindrical risers and an upper section. For each installation it has been necessary for the engineers to specify to the factory exactly the location in the risers where the pre-cast portholes are to be located to receive the pipes. Not only is it time consuming and costly to cast such holes accurately in the risers, as they are centrifugally cast in the molds over the reinforcing framework, but an error in placement results in a commercially unacceptable product. In addition, upon delivery of such a manhole, with pre-cast portholes as ordered, to the site, it sometimes happens that the pipe in the ground is not properly aligned with the pre-cast portholes, thus causing time consuming fitting deep in a trench which is often wet.

Not only are pre-cast pipe holes difficult and costly to make in pre-cast risers, but the heretofore much used pipe joint and seal described in U.S. Pat. NO. 3,348,850 to Scales of Oct. 24, 1967, calls for the pre-casting of a plurality of threaded inserts around the outside of such a pre-cast hole. In using this type seal, the inner face of the pre-cast hole cannot be cylindrical, but must be tapered to receive a compressible O-ring, which is compressed by a bolt tightened ring of rigid material against the tapered face, such operation depending on the accuracy of the emplacement of the threaded inserts.

To produce a pipe-to-manhole joint not requiring threaded inserts, metal flange rings and compressed O-rings, it has been proposed to provide a flexible manhole sleeve with a serrated flange at one end cast, or embedded, in the inner wall of the pre-cast porthole and having the other end sleeved around and strap clamped around the pipe. Not only has it been costly and time consuming to position such a flange for casting into the riser, but the embedment of the flange may tend to weaken the wall, while the permanent anchoring of the flange prevents easy replacement in case of damage in transit or on the site.

SUMMARY OF THE INVENTION

In this invention, the pre-cast portholes, and pre-cast portholes with embedded flexible sleeves of the prior art, have been eliminated entirely, so that the manufacturer may rapidly produce a plurality of centrifugally cast, reinforced-concrete, hollow cylindrical manhole risers free of pre-cast holes. Time and cost factors are thus reduced and existing casting machinery used more profitably. The placement of steps in the inside face of the riser is also eliminated.

After the pre-cast manhole risers of this invention have been fabricated, without portholes or embedded steps, the portholes are cut through the riser wall and the step recesses are cut into the inside wall at the precise location desired. Such cutting may take place at the pre-cast factory, but preferably takes place at the site, after the manhole base has been lowered into place and the riser has been lowered thereon. The cutting apparatus and method of the invention includes the clamping of a frame on the rim of the upstanding wall of the riser so that the frame depends vertically down over the area to be cut. The exact centre of the hole to be cut is marked by precision sighting along, or through, the actual pipe line already in the trench underground, so that the possibility of mislocation is avoided. Thereupon the cutter carriage and the cutter are moved on the frame to precise alignment with the centre mark and the cutter advanced to remove a core and form a perfect, smooth-faced, cylindrical pipe hole in the riser.

A flexible collar pipe-to-manhole seal of the invention is then sleeved on the pipe which is to enter the newly cut pipe hole, and the right angular flange of the collar is intimately surface sealed to the outside face of the outer wall of the riser around the hole, and the outer end of the collar is then ring clamped on the pipe. Hydrostatic pressure and back-filling retain the flange in position and the flange sealing means is preferably a layer of adhesive. The cutter frame, after being moved to each other location around the riser where a porthole is desired, may have a step hole drill inserted in place of the rotary porthole cutter and is used to precisely form the pattern of holes required to receive the expansible tips of the steps.

While, as shown in U.S. Pat. No. 3,090,260 to Brooks of May 19, 1963, and 3,293,952 to Fairbanks of Dec. 27, 1966, it has long been known to clamp a drill frame around a small diameter concrete pipe and cut out a core to insert a stub fitting, as far as I am aware no one in the prior art has heretofore proposed cutting a porthole in the relatively thick, reinforced concrete wall of a manhole riser, or to accomplish such cutting by affixing a frame and then moving a carriage and cutter on the frame to obtain precise alignment and accuracy.

DESCRIPTION OF A PREFERRED EMBODIMENT

Figure 1:
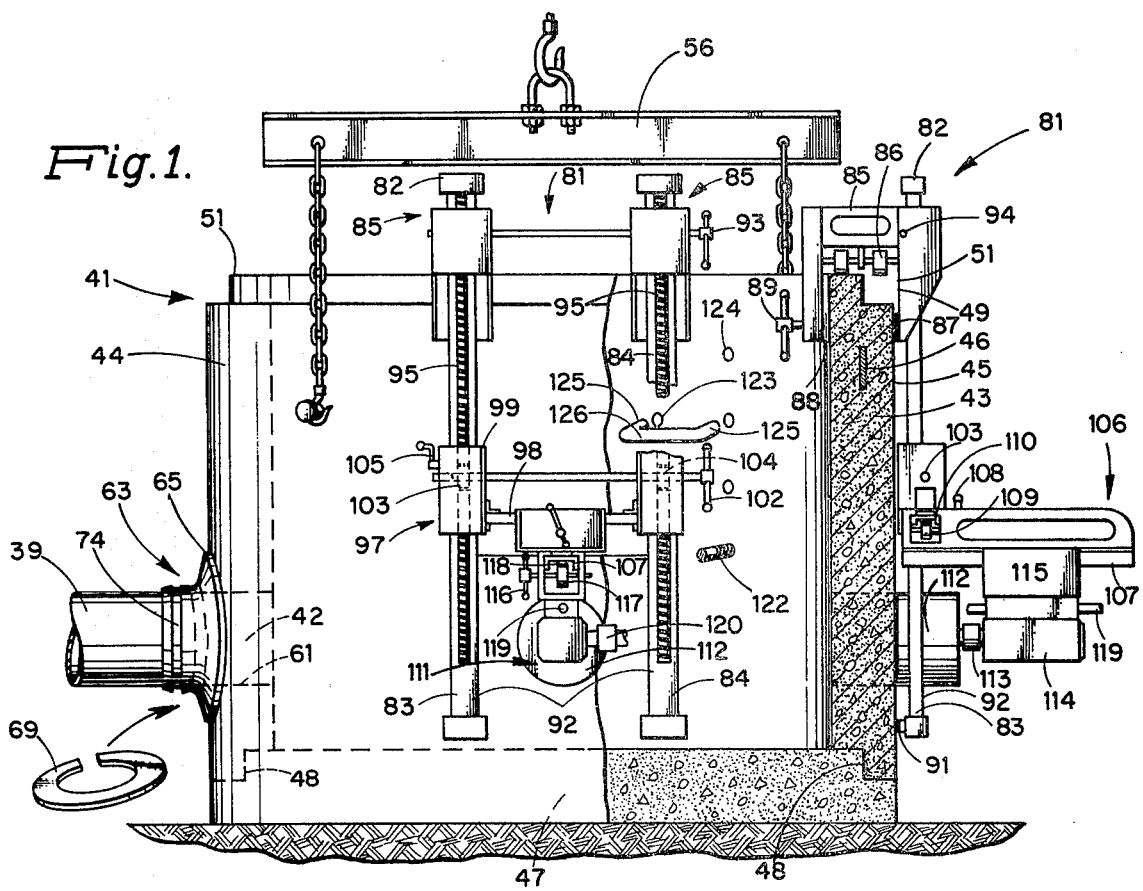
FIG. 1 is a side elevation of a manhole riser, set on a base, in a trench with on-the-site cutting of a porthole being accomplished.

As shown in the drawings, a typical underground sewer system 30 includes a trench 31 dug to a level 32, well below the frost line 33 and well below ground level 34. The bottom 35 of the trench usually is somewhat wet and muddy and often has obstructions, such as existing old utility lines. Thus, in the past, precision fitting of pipes into manholes has been difficult in the relatively cramped work space available.

As explained above, there may be several sewer pipe lines, such as 36, 37, 38, at different levels, and at different angles of approach, all intended to lead into a particular manhole 41. Usually, each pipe 36 is rectilinear and formed of jointed sections 39, the pipe section 39 adjacent a manhole 41 having to be entered into a porthole 42 in the upstanding side wall 43 of the cylindrical riser section 44 and sealed therein. Each manhole 41 is pre-cast of reinforced concrete 45 with metal grid reinforcement 46, and, while a riser and base could be formed in one piece, the base section 47 is usually separate and provided with an annular flange 48 for seating a riser, the risers being joined by a suitable mating flange 49. Each riser 44 includes an upper rim 51, which is horizontal when the circumferential outside face 52 and inside face 53 of cylindrical wall 43 is upstanding and vertical on the base 47.

Unlike the pre-cast, reinforced concrete manholes, or manhole risers, of the prior art, the manhole 41 and its risers 44 are free of pre-cast portholes or step holes and, therefore, may be manufactured at a rapid rate with no delay in forming spaces in the reinforcing mesh for the core of the porthole, arranging support for the core, and carefully attempting to locate the core exactly where specified by the engineers, such location occasionally proving to be out of line with the pipe as actually installed in the excavation. Instead, the porthole 42 of the invention is cut through the cylindrical wall 43, at the site 30, either on a crane truck 54 having a turntable 55, hoist crane 56 and vertically movable cutter carriage 57 with rotary cutter 58, after careful measurement under existing installation conditions, or preferably by cutting the riser while leveled and accurately emplaced on the base 47 in the trench 31.

Figure 4:
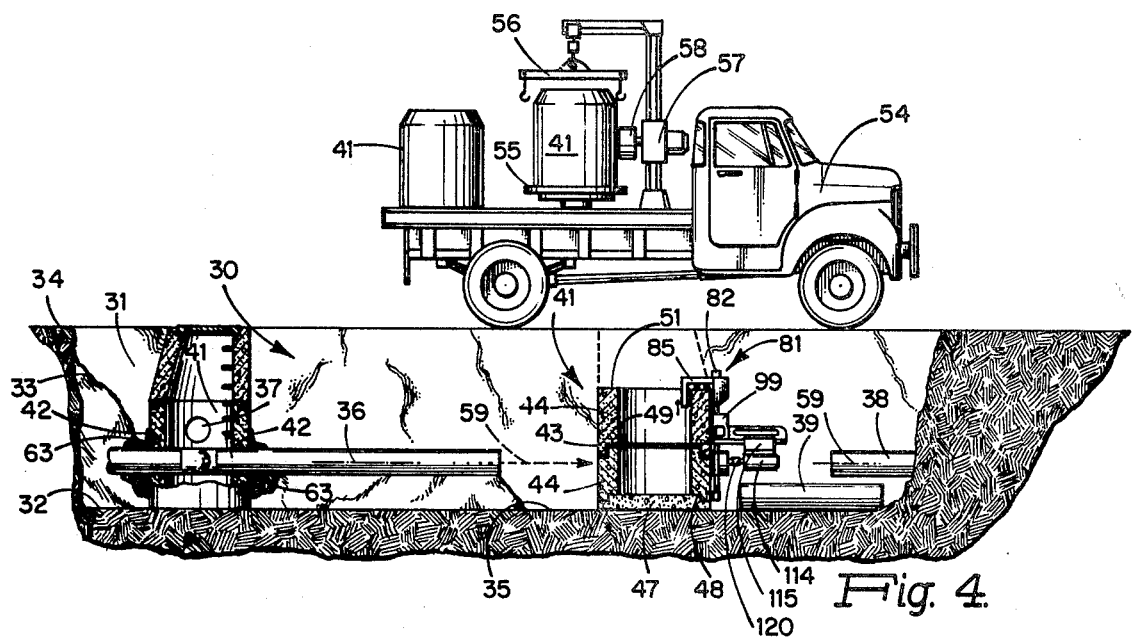
FIG. 4 is a side elevation, in section, of a sewer installation on a reduced scale.

Thus, as shown in FIG. 4, the pre-cast risers 44 are delivered on the site, placed on the base 47 and suitable transit, or other engineering equipment or sighting systems, is used to sight along an already installed pipe 37, 38 or 39, or through the same along the central longitudinal axis from an adjacent manhole, to precisely mark on the outside curved surface 52 of the riser, the exact centre of the area where the porthole 42 is to be cut. Because dependence is not placed on a pre-cast porthole, the smooth, unobstructed, inner cylindrical face 61 of cut porthole 42 need not be overly large with relation to the outside diameter of the pipe section 39 to be sealed therein, so that clearance can be minimal and just sufficient to permit slight adjustment due to any settling.

It will be understood that the riser need not be cylindrical and that some risers are polygonal in cross section. Similarly, the inner cut face 61 may be stepped, or countersunk, or cut face 61 may be tapered by reaming. Unlike a pre-cast hole, the face 61 will almost invariably include at least two exposed cut ends 127 of a reinforcing wire 46.

Figure 2:
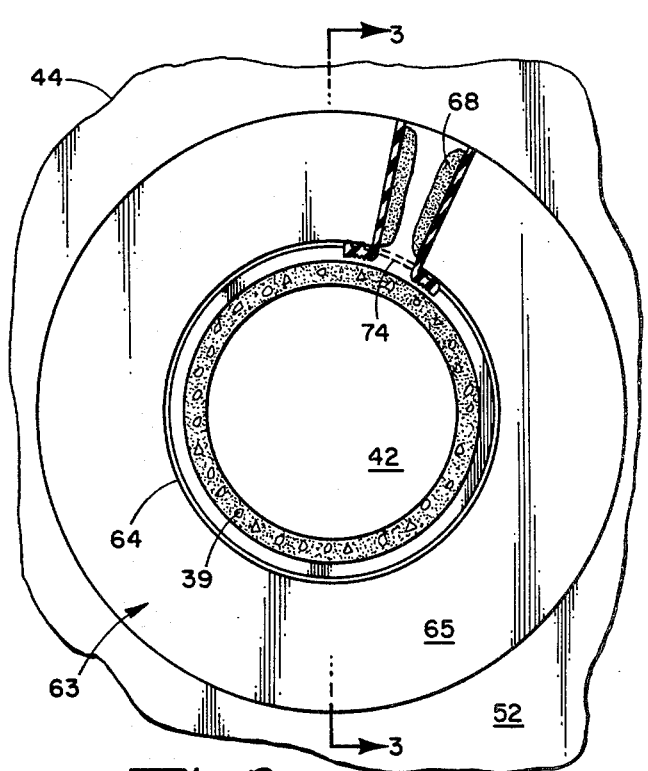
FIG. 2 is a front elevation on an enlarged scale of a flexible collar of the invention, in section, on line 2—2 of FIG. 3.
Figure 3:
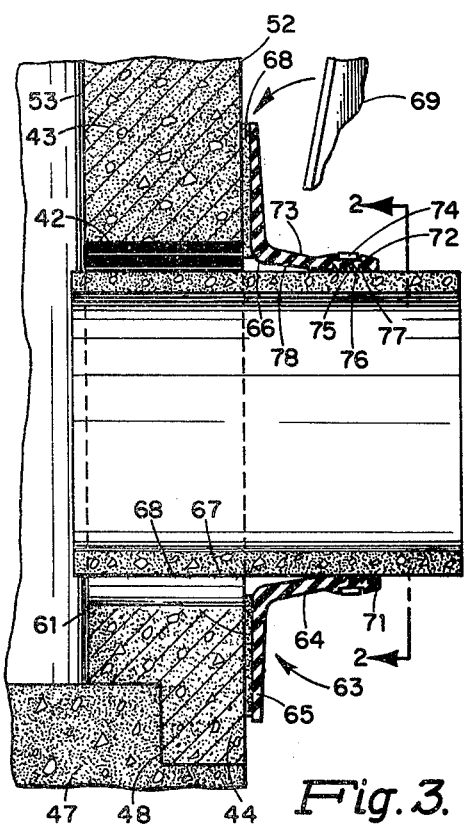
FIG. 3 is a side elevation, in section, on line 3—3 of FIG. 2.

As best shown in FIGS. 2 and 3, this invention includes a one-piece unitary quick attachable collar 63 for sealing the cut portholes 42, each collar 63 including an elongated sleeve 64 for receiving the end of a pipe section 39 and an integral, outwardly projecting, annular flange 65 at one end 66 of the sleeve. Preferably, the sleeve is about the same length as the distance the flange projects therefrom, this being at least three, and preferably about four inches for the size pipe and porthole shown, since a four-inch flange will seal the porthole even if, for installation reasons, it is decided to cut the hole several inches larger than the pipe diameter to accommodate grade levels.

The flange 65 extends in a plane normal to the longitudinal axis 59 of the pipe section 39 and is of gradually decreasing thickness, so that it is resilient, and of predetermined distortability to conform to the curved configuration of outside face 52 of wall 43 without pleating or wrinkling. Preferably, it is of elastomeric material such as Neoprene and the outer annular face 67 thereof is finely corrugated, or ribbed and grooved. A layer of pressure sensitive adhesive 68, such as self-adhering mastic, covers face 67, the layer 67 being covered during shipment by an annular, peelable, masking strip 68 of non-absorbent paper. A suitable adhesive is a three part epoxy available as Bonstone A108-B108-C108 from Bonstone Inc. of Winona, Minnesota. The other end 71 of sleeve 64 is cylindrical and provided with an annular clamp receiving groove 72 on the exterior face 73 thereof, for a ring clamp 74 and with corrugations 75 formed of alternate ribs 76 and groove 77 on the interior face 78 thereof, so that a tight seal is obtained when the collar is affixed on the pipe.

Thus, after the holes 42 are cut in the riser, a collar 63 is sleeved over the pipe section 39 to enter the hole, the masking strip 69 peeled off and discarded and the adhesive layer 68 on face 67 intimately applied to the exterior face 52 of wall 43 around the hole 42 to seal the porthole. The outer end of the collar is then clamped by clamp 74. Back filling and hydrostatic pressure on the outside of the manhole assure a water-tight seal.

Figure 5:
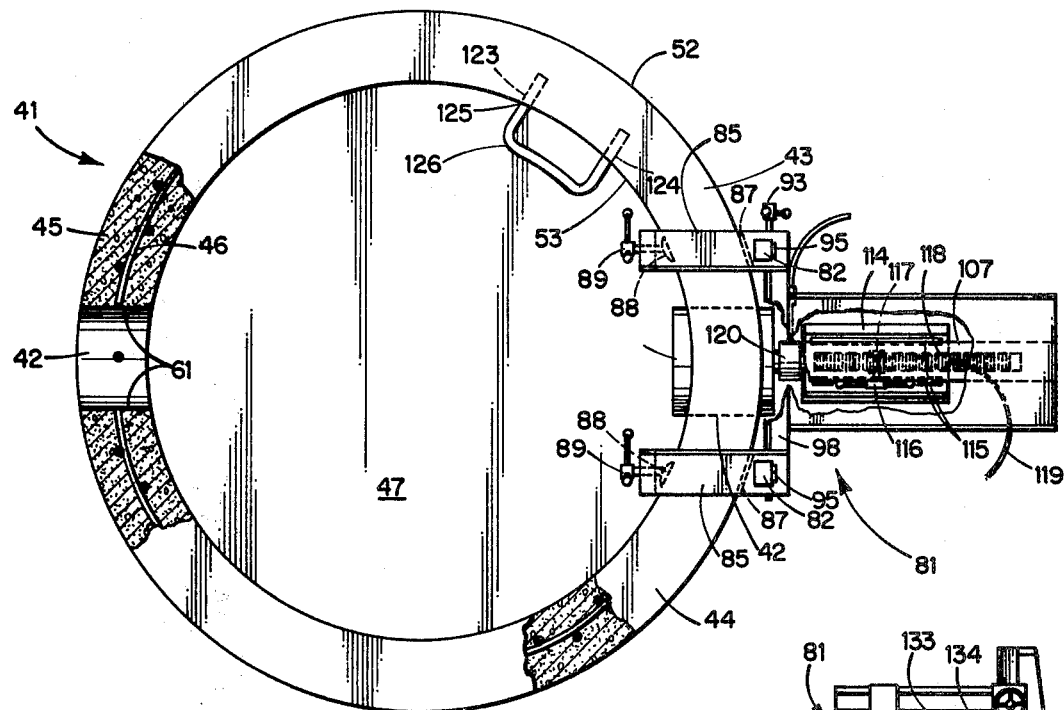
FIG. 5 is a plan view of the manhole riser shown in FIG. 1, with the cutting apparatus of the invention clamped on the rim of the riser, and partly broken away to show a cut porthole face.

As best shown in FIGS. 4 and 5, the cutter apparatus 81 of the invention, when portable, includes frame means 82 consisting of a pair of posts 83 and 84 of circular cross section, arranged to depend vertically on the outside circumferential face 52 or the inside circumferential face 53, of the upstanding wall 43 of a riser by clamp means 85 detachably affixed on the upper rim 51 of the riser. The clamp means 85 includes rollers, or wheels, 86 in the respective clamp brackets for riding on the upper rim while the frame means is moved sidewise to a position over the area where a porthole 42 is to be cut. Means 85 also includes a fixed jaw 87 and a threadedly tightenable movable jaw 88 on each means, together with a handle 89 and a lower rubber pad 91, all for the purpose of quickly mounting, aligning and clamping the frame 92 in position. The posts 83 and 84 are jointly movable vertically in the clamp means by handle 93, gears 94 and gear racks 95 to provide a rapid, coarse vertical adjustment thereof.

Cutter carriage means 97 is provided comprising the carriage 98 having a pair of sleeves 99 and 101 vertically guided on posts 83 and 84, the carriage being finely adjustable vertically by the handle 102, gears 103 and 104 and lockable by the lock 105.

Cutter track means 106 includes the cutter track 107, the track 107 being movable horizontally relative to the carriage for fine adjustment thereon, by the handle 108, gear 109 and gear rack 110.

The cutter assembly 111 includes the rotary core drill 112, a chuck 113, motor 114 and motor support 115, movable on track 107 in a path normal to the plane of wall 43 by the handle 116, gear 117 and rack 118. Motor 114 is an air, or hydraulic, motor fed by fluid line 119 and water jets are supplied to the cutter through fluid line 120.

On the site, after the cut portholes are formed by the rotary core drill 112, and the flexible collars 63 sealed over the portholes, the cutter apparatus maybe removed from the outside, if on the outside, and suspended on the inside of the manhole 41, with a step hole drill 122 inserted in chuck 113 in place of the core drill 112. A pattern of step holes such as 123 and 124 are then cut in a location within the manhole which does not interfere with the pipes therein by moving the cutter and carriage on the frame, whereupon the expansible tips 125 of metal steps 126 are inserted in the holes. Steps 126 may be metal, plastic or of other suitable material.

It will be understood that the invention herein, with its easily pre-cast risers, on-the-site, precisely cut, pipe-to-manhole openings and adhered flexible collar seals over the openings enables a pipe producer to make manholes profitably with existing equipment, to offer instant manhole service to contractors and to provide contractors with flexibility at the installation. It has been found that it takes three times as long to produce a manhole section with pre-cast portholes, as it does to first pre-cast the riser free of such holes and to then cut the holes afterwards. At the installation, contractors and engineers are enabled to make both horizontal and vertical adjustments from specifications to overcome adverse natural conditions, thereby reducing the threat of almost any obstacle in the line of placement.

Figure 6:
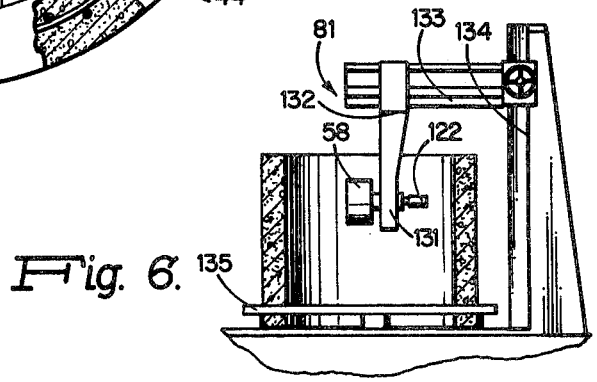
FIG. 6 is a side elevation of an "in-plant" cutter.

As shown in FIG. 6, an "in-plant" cutter apparatus 81 preferably will include a motor carriage 131 having a porthole cutter 58 on one end and having a pair of stephole cutters 122 on the other end, the carriage 131 being rotatable at 132, horizontally movable on track 133 and vertically movable on a suitable frame 134 and the risers being turnable on turntable 135.

While an adhesive is preferred for affixing the flange outer face 67 to the face 52 of the riser, the affixation could be accomplished by use of a clamp ring attached with anchor bolts, or by other suitable mechanical fastening mechanisms, but the pressure sensitive adhesive 68 is much more practical, rapid and efficient.

When the pipe-to-manhole seal of this invention is to be accomplished in the plant rather than on the site, the manhole is first pre-cast of wire meshed, reinforced concrete, free of pre-cast portholes. If, for example, the pipes to be sealed are of twelve inch outside diameter, the portholes are then cut by apparatus 81, as in FIG. 6, with fourteen inch diameter where specified by the engineers. The face 67 of the flange 65 of each collar 63 is then affixed around the cut hole by the rubber to concrete adhesive 68, and the flange also anchored in place by one or more concrete penetrating studs to prevent slippage while the adhesive firmly sets in about one hour. The manhole is then delivered to the site with the collars in place ready to have the pipes inserted and ring clamped in the collar sleeves 64, there being sufficient flexibility in the material of the collar and sufficient clearance between the twelve inch pipe and fourteen inch hole to permit considerable adjustment of angle of the pipe laterally. When the collar is adhered on the site, it may be slid laterally for adjustment for one or two inches while still retaining the preferred outer two and one half inch annular, peripheral, corrugated, band of intimate adhesive contact with the face of the riser. Backfilling will hold the flange in place for the time it takes for the adhesive to set but in addition, the flange may be studded, or ringed and studded into the concrete as extra assurance of a firm adhesive bond.

I claim:

1. In combination with a pre-cast, wire mesh, reinforced concrete manhole, having an upstanding cylindrical side wall,
    apparatus for core drilling a hole in said side wall of said manhole, comprising:
    frame means detachably supported vertically on a face of said upstanding cylindrical wall of said manhole, by clamp means tightened on the upper rim thereof;
    said frame means comprising a pair of spaced-apart parallel posts, each having a clamp bracket proximate the upper end thereof, each clamp bracket having rollers therewithin for riding on the rim of a manhole;
    carriage means movable vertically on said frame means;
    said carriage means comprising a carriage extending between said posts and having an integral sleeve at each opposite side thereof slidable on one of said posts;
    cutter track means movable horizontally on said carriage means,
    and a cutter movable on said cutter track means in a path normal to the side wall of said manhole for cutting a port hole therethrough.

2. Apparatus as specified in claim 1 wherein: said cutter track means includes gear rack, gear and handle mechanism for moving said track sidewise in a horizontal plane relative to said carriage.

3. In combination with a reinforced concrete manhole having an upstanding side wall with an upper rim apparatus for core drilling a hole in said side wall comprising:
    frame means supported on said upper rim and including a pair of posts depending vertically along the face of the upstanding cylindrical wall of said manhole and including clamp means tightened on said upper rim;
    carriage means movable vertically on said posts, said means including fine threaded vertical adjustment mechanism;
    core drill track means movable horizontally sidewise on said carriage means, said means including fine threaded sidewise adjustment mechanism;
    a core drill movable on said core drill track means in a path normal to the side wall of said manhole for core drilling a port hole therethrough,
    said frame means including a clamp bracket proximate the upper end of each said post, each clamp bracket having a roller therewithin for riding on the upper rim of the side wall of a manhole,
    and said carriage means includes a carriage extending between said posts and having an integral sleeve at each opposite side thereof slidable on one of said posts.

4. In combination with a reinforced concrete manhole having an upstanding wall with an upper rim
    portable apparatus for core drilling a hole in said side wall of said pre-cast, reinforced concrete manhole, at a construction site, said apparatus comprising:
    frame means detachably supported on a face of said side wall, said frame means including a pair of spaced apart parallel posts;
    carriage means movable on said frame means, said carriage means including a carriage extending between said posts and having an integral sleeve at each opposite side thereof slidable on one of said posts and
    core drilling means mounted on said carriage means and movable in a horizontal path, normal to the face of the said upstanding side wall of said manhole for coring a hole therethrough, and clamping means at the upper end of said frame means, said clamping means having threaded jaws for clamping over the upper rim of said side wall to detachably secure said apparatus on a face of said side wall and having rollers therewithin for riding on the said upper rim.

5. In combination with a reinforced concrete manhole riser having a hollow cylindrical wall
apparatus for core drilling a hole in said upstanding, hollow cylindrical, wall of said reinforced concrete manhole riser said apparatus comprising:
frame means including at least two parallel vertical posts;
vertically movable cutter carriage means movable in a vertical path on said post, said carriage including at least two integral sleeves each slidable on one of said posts;
power driven rotary cutter mechanism mounted on said carriage including a hollow cylindrical core drill, rotatable in a vertical plane on a horizontal axis, for coring a hole in said side wall;
turntable mechanism alongside said frame means, including a turntable rotatable in a horizontal plane on a vertical axis for rotatably supporting said upstanding manhole riser;
and means supporting one said mechanism relative to the other, for movement back and forth in a horizontal plane, to enable said core drill to penetrate through said wall of said riser.

6. Apparatus as specified in claim 5 wherein:
said power driven rotary cutter mechanism includes a plurality of said core drills of different diameters.

7. Apparatus as specified in claim 5 plus a wheeled truck supporting said turntable mechanism.

* * * * *